United States Patent [19]

Notardonato et al.

[11] 4,358,296

[45] Nov. 9, 1982

[54] DEOXYGENATING APPARATUS AND METHOD

[75] Inventors: Luigi Notardonato, Park Ridge; Casimir Pulawski, Chicago; David M. Kemp, Jr., Naperville, all of Ill.

[73] Assignee: FMC Corporation, Chicago, Ill.

[21] Appl. No.: 239,209

[22] Filed: Mar. 2, 1981

[51] Int. Cl.³ .......................................... B01D 19/00
[52] U.S. Cl. ........................................ 55/38; 55/53; 55/188
[58] Field of Search ............... 55/38, 39, 52, 53, 166, 55/169, 186, 189, 193, 196, 198, 240, 342, 343, 188; 99/275, 276, 277, 277.1, 277.3, 323.1, 323.2; 202/158; 261/113, 114 R, 114 JP, DIG. 7; 426/475, 477

[56] References Cited

U.S. PATENT DOCUMENTS

| | | | |
|---|---|---|---|
| 24,543 | 6/1859 | Dickinson | 261/113 X |
| 64,452 | 5/1867 | Schweikhart | 261/113 |
| 516,154 | 3/1894 | Ellis | 202/158 |
| 517,161 | 3/1894 | Hunt | 55/52 |
| 1,276,690 | 8/1918 | Pyzel | 261/113 X |
| 1,851,163 | 3/1932 | Daugherty | 55/189 X |
| 1,970,783 | 8/1934 | Walker | 55/186 X |
| 2,041,059 | 5/1936 | French | 55/55 X |
| 2,117,604 | 5/1938 | Fessler et al. | 99/277.1 |
| 2,252,313 | 8/1941 | Bostock | 55/193 X |
| 2,457,903 | 1/1949 | Kantor et al. | 55/193 X |
| 2,715,607 | 8/1955 | Lee | 202/158 X |
| 2,767,967 | 10/1956 | Hutchinson | 261/113 |
| 3,246,757 | 4/1966 | Martin | 210/86 |
| 3,466,151 | 9/1969 | Sicard et al. | 202/158 X |
| 3,489,506 | 1/1970 | Galstaun et al. | 261/114 R |
| 3,574,987 | 4/1971 | Skoli et al. | 55/193 |
| 3,584,438 | 6/1971 | Skoli et al. | 55/193 |
| 3,632,315 | 1/1972 | Uitti et al. | 261/113 X |
| 3,705,477 | 12/1972 | Longo et al. | 55/52 X |
| 3,730,690 | 5/1973 | McCarthy et al. | 261/114 R X |
| 3,741,552 | 6/1973 | Skoli et al. | 55/39 X |
| 3,780,198 | 12/1973 | Pahl et al. | 426/477 |
| 3,807,143 | 4/1974 | Dunn | 55/223 |
| 3,832,474 | 8/1974 | Karr | 426/477 |
| 3,928,513 | 12/1975 | Lova | 261/113 |
| 3,960,066 | 6/1976 | LaRocco et al. | 99/323.2 |
| 4,112,828 | 9/1978 | Mojonnier et al. | 426/477 X |
| 4,216,711 | 8/1980 | Skoli et al. | 426/477 X |
| 4,265,167 | 5/1981 | Mojonnier et al. | 426/477 X |

Primary Examiner—Robert H. Spitzer
Attorney, Agent, or Firm—Trexler, Bushnell & Wolters

[57] ABSTRACT

Deoxygenating apparatus and method for use with a system for producing deoxygenated beverages comprises a deoxygenating column with stacked units each comprising a distributor plate and a subjacent shallow tray, both of which are perforated for downward dripping of water. Carbon dioxide gas flows upwardly, counter to the water, in a serpentine path over the plates and trays and through the dripping water for replacing the air in the water by the carbon dioxide gas. The water flow rate and extent of perforation of the plates and trays is such that films of water cover the respective plates and trays to permit some of the carbon dioxide gas to bubble through the plates and trays and thereby enhance the absorbtion of the gas into the water.

1 Claim, 5 Drawing Figures

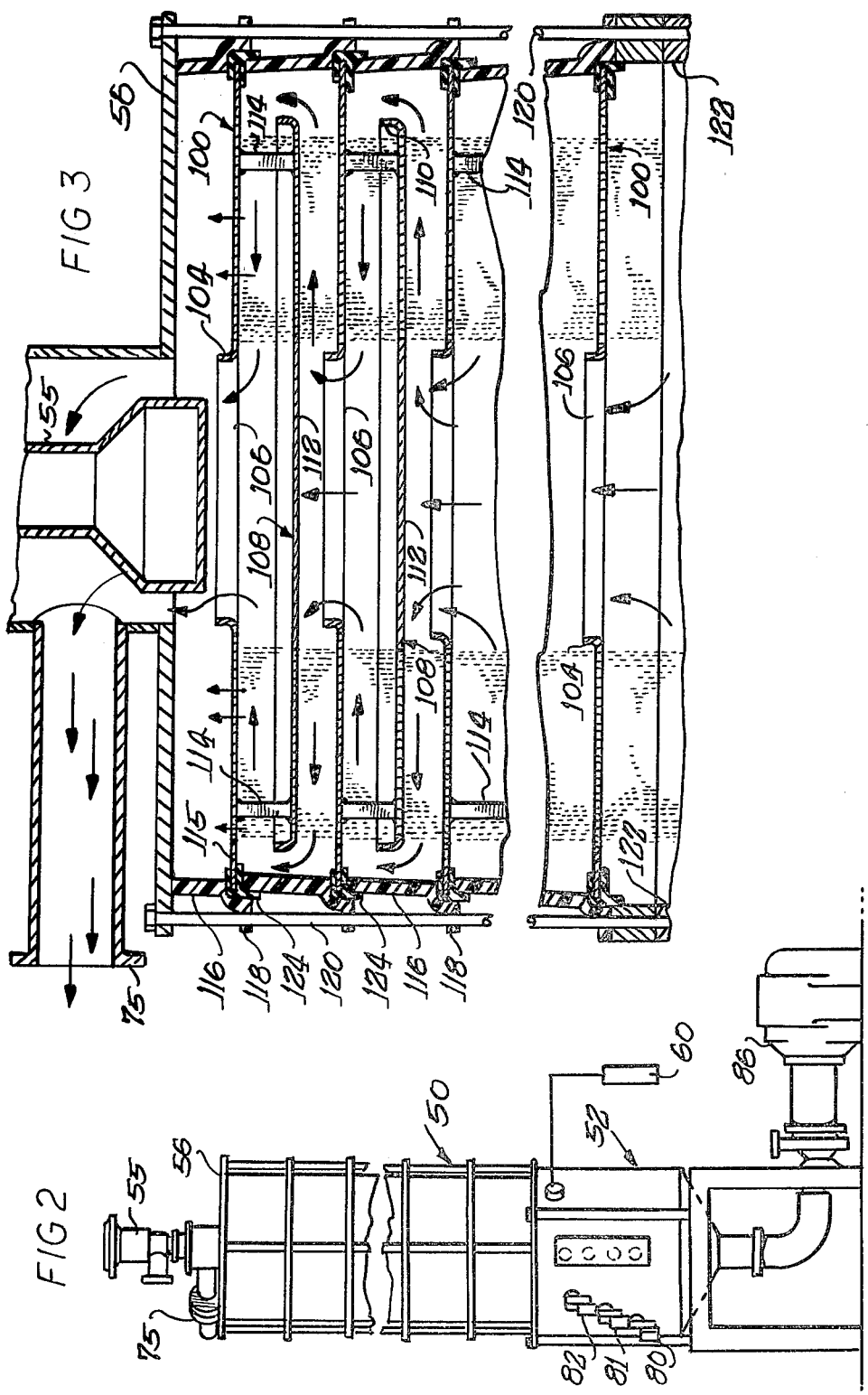

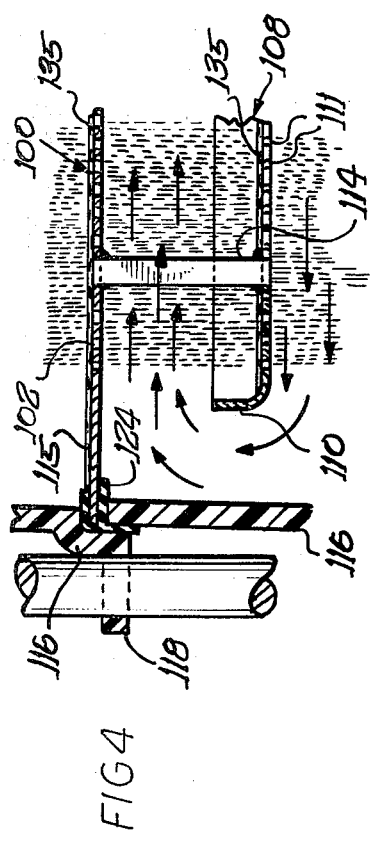
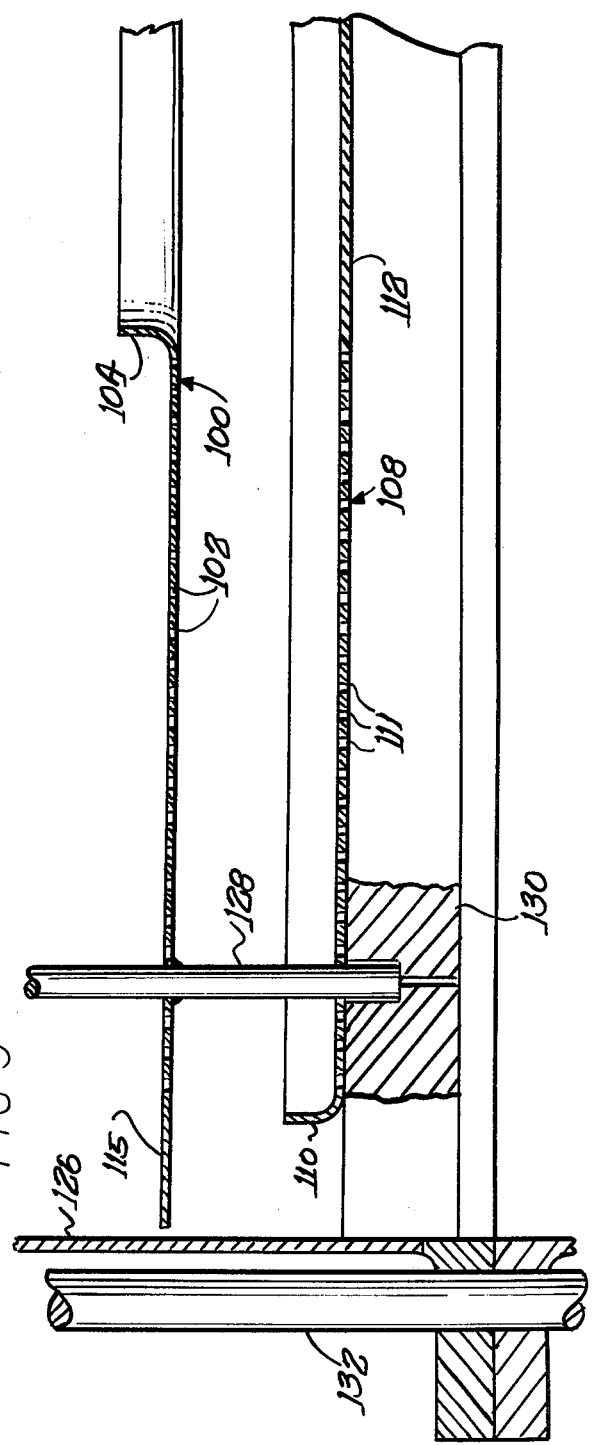

:

DEOXYGENATING APPARATUS AND METHOD

BACKGROUND OF THE INVENTION

This invention relates generally to gas and liquid contact apparatus and methods, and more particularly to a method and apparatus for removing oxygen-containing air from water. The apparatus with which the present invention is concerned is a deoxygenating column which may form part of a system used for the production of beverages, such as soft drinks and beer.

The present invention relates to improvements on the methods and apparatus disclosed in U.S. Pat. to Skoli et al No. 4,216,711 granted Aug. 12, 1980. In that patent it is pointed out that beer concentrate or heavy beer may be combined with deoxygenated water to form an end product known as bright beer. The deoxygenation of the water is required because of the presence of even a fraction of part air in one million parts water can result in an unacceptable end product. Accordingly, there is disclosed in said patent a system which will combine beer concentrate or heavy beer with deoxygenated water on a continuous basis to form a bright beer for storage, filling or later operations. The system includes one or more deoxygenating columns in which the water is introduced through the top and falls downwardly through the column to an exhaust pump module. Carbon dioxide gas is introduced through a metering device and flows upwardly in a serpentine fashion to provide an effective counterflow arrangement that results in a highly effective removal of the air and oxygen from the water and replacement by carbon dioxide gas.

OBJECTS AND SUMMARY OF THE INVENTION

An object of this invention is to provide an improved deoxygenating column that results in an enhanced and more effective deoxygenating effect than has been obtainable with previously used apparatus. Specifically, the present invention can deliver water containing only 0.05-0.01 or less parts of air per million parts of water.

A further object of this invention is to provide a method of deoxygenating water which results in a random but effective co-mingling of the liquid passing downwardly through the column with the upwardly flowing gas.

A more specific object to this invention is to provide an apparatus of the type stated in which the deoxygenating column can be made with a lesser height than presently available columns of comparable capacity. Viewed another way, for a given height the capacity of the column may be increased as compared to the columns of comparable height now available commercially.

In accordance with the foregoing objects the invention provides, in a deoxygenating column, a water exhaust pump bottom unit, water level control means mounted in and on the pump bottom unit for controlling the water level therein, a plurality of the deoxygenating units mounted atop the pump bottom unit in vertical array, and a metering device for introducing carbon dioxide gas into the column so as to provide virtually complete exchange of carbon dioxide for the oxygen-containing air previously dissolved in the water; means forming an outer column wall, at least one of said units having a horizontal foraminous distributor plate inwardly of said wall, and means forming an opening centrally of said distributor plate; said wall, plate, and last-mentioned means forming a foraminous structure of sufficient porosity to leave a coating of water on the plate of thickness such that some of the gas bubbles through the distributor plate and the remainder of the gas flows across said plate and through said opening.

The invention further embodies a method of removing oxygen-containing air from water comprising: providing a plurality of oxygenating units in vertical array and in which each unit comprises at least one horizontal foraminous member such that a number of the members are vertically spaced, passing water downwardly through said foraminous members at a rate sufficient to cause droplets of water to flow downwardly from member-to-member and at the same time leave a thin coating of water on at least some of said members, introducing stripping gas (such as carbon dioxide) into the column in counter-flow to said water so that the gas passes generally upwardly in a serpentine path that includes a central region of some of said members, the spaces between the members wherein the gas flows horizontally across the downwardly falling droplets, and the peripheries of others of said members, the stripping gas thereby contacting said droplets to provide an exchange of the stripping gas for the oxygen-containing air previously dissolved in the water, such coating of water being sufficiently thin such that some of the gas flows through the coating on at least some of said foraminous members to enhance further said exchange of stripping gas for oxygen-containing air.

BRIEF DESCRIPTION OF THE FIGURES

FIG. 2 is a side elevational view of the improved deoxygenating column which utilizes the construction and method of the present invention;

FIG. 3 is a fragmentary sectional view, on an enlarged scale, of the deoxygenating column, particularly at the upper end thereof;

FIG. 4 is a fragmentary sectional view similar to FIG. 3 but showing a portion thereof on much enlarged scale; and FIG. 5 is a fragmentary sectional view of a modified form of deoxygenating column in accordance with the present invention.

DETAILED DESCRIPTION

Figure 1:
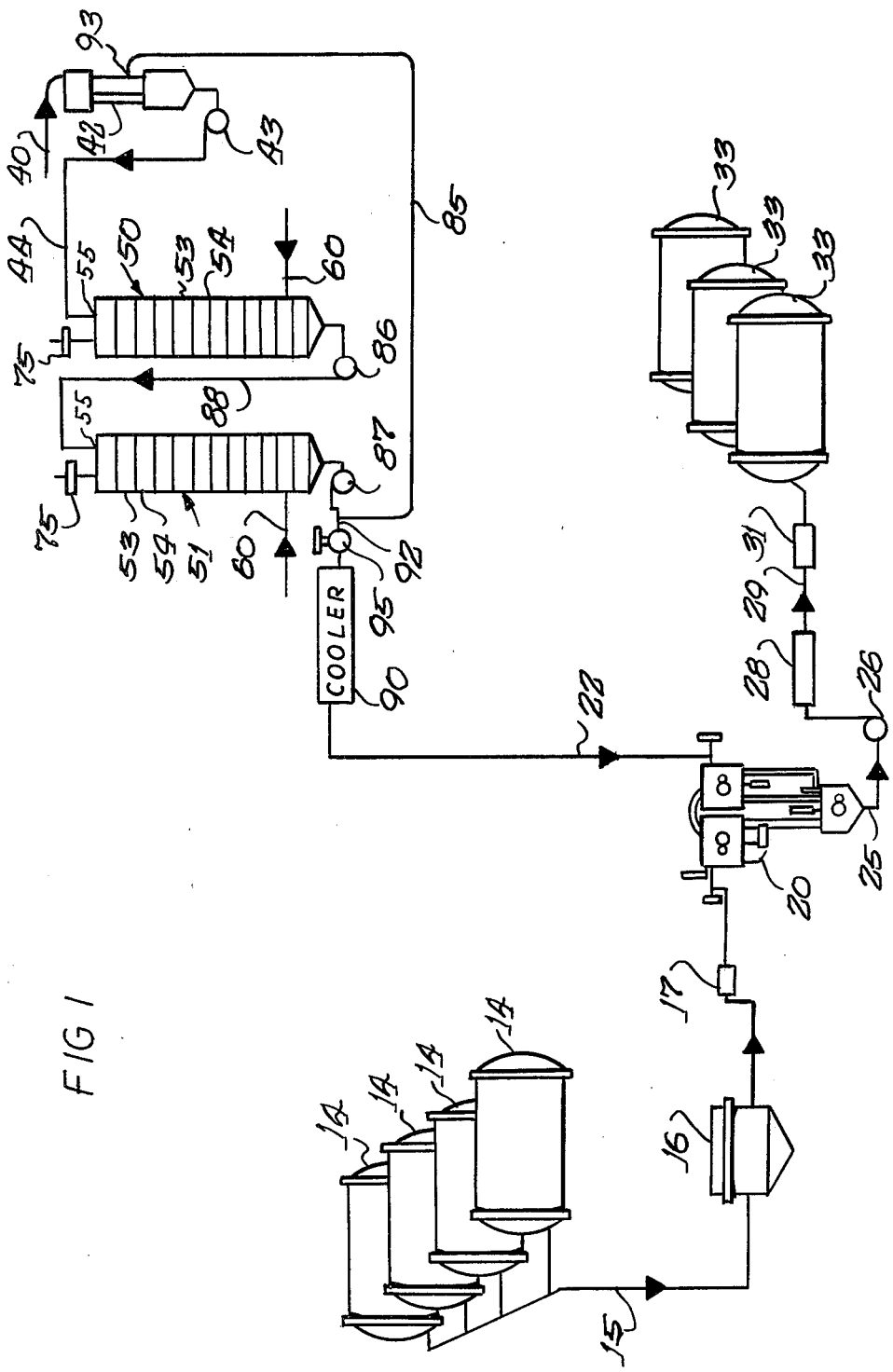
FIG. 1 is a diagram, somewhat schematic, showing a system embodying the present invention for preparing a bright beer product from water and a heavy beer concentrate.

Referring now in more detail to the drawing there is shown a system for producing an end product by combining a concentrate (eg. beer concentrate) and deoxygenated water. The concentrate may be stored in one or more tanks 14 and conveyed through piping 15 to a filter 16 and regulator 17 to a conventional proportioner unit 20. Deoxygenated water is continuously supplied through appropriate piping 22 to the proportioner 20 so that the concentrate and water are mixed by the proportioner to form the end product. The end product beverage is withdrawn from the proportioner 20 through piping 25 under the action of pump 26 which also serves to pump the beverage to a carbonator unit 28 for carbonating the mixture. The mixture then passes through pipe 29 and a flow meter 31 to storage tanks 33 or suitable bottling equipment.

The untreated water is initially supplied to the system through an input pipe 40 under control of a flow metering device 42. The raw water is withdrawn from the metering device 42 by a pump 43 and delivered through piping 44 to one or more deoxygenating columns 50, 51 of a type and character hereinafter more fully described. Broadly speaking, however, each column 50, 51 includes a pump bottom unit 52 and a number of deoxygenating unit modules 53, 54 etc. which are stacked in vertical array. The number of modules 53, 54 etc. which are stacked on each pump unit depends upon the amount of deoxygenating to be accomplished and the in-plant overhead clearance available.

In general, the columns 50, 51 are in series and water is introduced into each unit through a top inlet 55 and flows downwardly through the column to the bottom pump unit 52. Carbon dioxide or other stripping gas is introduced through a metering device 60 at the pump module 52, and the gas flows upwardly through the column to a column top 56 in generally counter-flow passage with respect to the water, thereby removing the air and oxygen from the water and replacing it by the stripping gas. Excess gas from the column 50 or 51 is exhausted through an outlet pipe 75 at the top of the column.

Deoxygenated water from the first column 50 is drawn off by the pump bottom unit 86 and delivered through piping 88 to the top of the second column for further deoxygenating action. The deoxygenated water from the second column 51 is pumped by the pump 87 through valve 95 and cooler 90 for delivery to the piping 22.

Switches may be provided from the pump unit 52 to assist in controlling the water flow through the columns 50, 51. Thus, a first switch 80 provides a low level control to cease the operation of the pump module in order to allow the water level to rise within the columns. A second switch 81 can be used to direct the oxygenated water away from the downstream portions of the system and to other apparatus such as filter for use in filter washing.

If desired, a third switch 82 and the valve 95 may be used as a high level control so as to operate a recirculating line 85 and route the water from the deoxygenating column 51 back to the flow meter 42 if the demand for water by the downstream proportioner 20 is reduced. This recirculation line 85, if included, can be connected at one end 92 downstream of the pump 87 and at another end 93 to the flow meter 42. The recirculating line 85 permits water to be continuously routed through the columns 50, 51 so as to deoxygenate the water to a predetermined amount before releasing the water downstream. The switch 82 and recirculation line 85 are not necessary to the effective operation of the invention, however.

Referring now more particularly to FIGS. 3 and 4, which show the novel deoxygenating column, it will be seen that the deoxygenating unit 53, 54 etc. each comprises a horizontal foraminous distributor plate 100 having an annular band of holes or perforations 102 and an upwardly turned central lip 104 which defines a central opening 106. The lip 104 serves to reinforce or rigidify the distributor plate 100 and may also constitute a relatively short stack for passage of the stripping gas, as will be presently more fully described. Welded or otherwise rigidly secured to and depending from each distributor plate 100 are circumferentially disposed bars 114 for suspending a foraminous tray 108 having a short, peripheral upstanding lip 110. The tray 108 is perforated to provide an annular band of holes 111 that is similar to holes 102 in the distributor plate 100. The inner and outer radial extent of the band of holes 102 is identical to that of the band of holes 111, and the several bands of holes 102, 111 are in vertically spaced registration. The tray 108 has a central imperforate portion 112 of circular configuration and which defines the inner radial extent of the band of holes 111. The outer radial extent of the band of holes 111 is adjacent to the lip 110. Since the distributor 100 is of larger diameter than the tray 108, the distributor is left with an imperforate peripheral rim portion 115 (FIG. 4).

The outer peripheral wall of the column 50 is comprised of a plurality of encircling wall sections 116 formed of a suitable known plastic such as a transparent polycarbonate resin of the type sold under the trademark "Lexan". Each wall section 116 comprises an outwardly projecting flange 118, flanges 118 having aligned vertical openings for receiving tie rods 120. Gaskets 124 are interposed between adjacent wall sections 116. Furthermore, the gaskets 124 receive the imperforate rim portions 115 of the respective distributor plates 100 so as to form seals thereat. The tie rods 120 are circumferentially disposed about the wall sections 116 and in a known manner are threaded into the anchors 122 and tightened down so as to maintain the several deoxygenator units and wall sections assembled into the column 50.

In use, untreated water from the inlet 55 is deposited on the uppermost tray 108 and from there drips downwardly onto the subjacent distributor plate 100. From the distributor 100 the water then drips downwardly to the subjacent tray and so forth from tray to distributor plate until the water is collected at the bottom of the column. The upperwardly flowing gas travels in a serpentine path through the central openings 106, through the horizontal spaces between the trays 108 and the distributor plates 100, and around the peripheries 110 of the trays, all as shown by the arrows in FIGS. 3 and 4, until the gas is exhausted through the top openings 75. The rate of water flow is such as to leave a film of water 135 on each of (or at least some of) the distributor plates 100 and on each of (or at least some of) the trays 108. This film or coating of water is of such thinness that at least some of the gas flows through the openings 102 in the distributor plate and through openings 111 in the tray while the remainder of the gas flows in the serpentine path, as previously described. Thus, the gas not only passes horizontally across the droplets of water draining from tray to distributor plate but also bubbles upwardly through the films of water on at least some of the distributor plates 100 and trays 106. The result is that the transfer of the gas to the water is considerably enhanced as compared to arrangements wherein the level of water in the tray forms a complete barrier to the passage of gas therethrough. Moreover, the shallow tray design herein makes the column 50 shorter for a given deoxygenating capacity.

The films 135 of water on the distributor plates and trays will, of course, vary somewhat in thickness from plate to plate or from tray to tray. In general, however, the film may be made of the order of one-sixteenth of an inch or less, and in some instances the film is sufficiently thin that at times the film provides substantially no pressure head across the plate or tray, as the case may be.

By way of example but not of limitation, the holes 102 or 111 may be one-sixteenth of an inch in diameter and seven sixty-fourths of an inch on centers. This provides approximately ninety-eight holes per square inch and 30 percent open area in the perforated zones. This high density of holes and hole area can be obtained by any of a number of known aperture-forming devices and processes.

FIG. 5 shows a modified form of the invention in which the column wall is a cylindrical shell 126. The trays 106 and the distributor plates 100 are supported on a series of vertical rods 128 that are located within the column and are supported at the pump bottom unit 52 in an anchor plate or spider 130. One such rod 128 is shown in FIG. 5, but it will be understood that there are a number of such rods circumferentially spaced around the central axis of the column. These rods 128 take the place of the bars 114. Thus, each of the distributor plates 100 and trays 106 is welded to the rods 128 at predetermined spaced intervals so as to provide a proper drip zone for the water while at the same time resulting in a compact construction. Alternatively, spacer bushings can be placed around the rods 128 so as to locate the plates 100 and trays 106 at the desired vertical intervals. The shell 126 may be maintained assembled with the column in any suitable way as by tie rods 132 that are threaded into suitable anchors as in FIGS. 2 and 3.

The invention is claimed as follows:

1. A method of removing oxygen-containing air from water comprising: providing a plurality of deoxygenating units in vertical array and in which each unit comprises at least one horizontal foraminous member such that a number of members are vertically spaced to provide horizontal paths therebetween, passing water downwardly through said foraminous members at a rate sufficient to cause droplets of water to flow downwardly from member-to-member and at the same time leave a thin coating of water on at least some of said member, introducing stripping gas into the column in counterflow to said water so that some of the gas passes generally upwardly in a serpentine path that includes passage upwardly through an open central region of some of said members, passage horizontally through the spaces between said members, wherein said gas flows horizontally across the downwardly falling droplets, and passage upwardly around the peripheries of others of said members, the stripping gas thereby contacting said droplets to provide an exchange of stripping gas for the oxygen-containing air previously dissolved in the water, said coating of water being sufficiently thin such that the rest of the gas bubbles vertically through the coatings on at least some of said members to enhance further said exchange of stripping gas for oxygen-containing air at the same time said exchange is taking place due to gas flow along said serpentine path.

* * * * *